United States Patent
Simske et al.

(10) Patent No.: US 9,165,218 B2
(45) Date of Patent: Oct. 20, 2015

(54) DISTANCE-BASED IMAGE ANALYSIS

(75) Inventors: Steven J Simske, Fort Collins, CO (US); Malgorzata M Sturgill, Fort Collins, CO (US); Marie Vans, Ft. Collins, CO (US); George D Guillory, The Woodlands, TX (US); Paul S Everest, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/235,867

(22) PCT Filed: Sep. 12, 2011

(86) PCT No.: PCT/US2011/051217
§ 371 (c)(1),
(2), (4) Date: Jan. 29, 2014

(87) PCT Pub. No.: WO2013/039474
PCT Pub. Date: Mar. 21, 2013

(65) Prior Publication Data
US 2014/0185943 A1    Jul. 3, 2014

(51) Int. Cl.
*G06K 9/62* (2006.01)
*G06K 9/03* (2006.01)

(52) U.S. Cl.
CPC .............. *G06K 9/6267* (2013.01); *G06K 9/036* (2013.01); *G06K 9/6202* (2013.01); *G06K 9/6218* (2013.01)

(58) Field of Classification Search
CPC ... G06T 2200/00; G06K 9/00711; G06K 9/62
See application file for complete search history.

(56) References Cited

U.S. PATENT DOCUMENTS

| | | | |
|---|---|---|---|
| 5,600,574 A | 2/1997 | Reitan | |
| 6,205,247 B1 | 3/2001 | Breuer et al. | |
| 2008/0063240 A1 | 3/2008 | Keng et al. | |
| 2009/0073192 A1 | 3/2009 | Kobayashi | |
| 2010/0194094 A1 | 8/2010 | Kiuchi et al. | |
| 2010/0195123 A1 | 8/2010 | Fujioka | |
| 2010/0232719 A1 * | 9/2010 | Vincent et al. | 382/225 |
| 2010/0265320 A1 | 10/2010 | Treado et al. | |

FOREIGN PATENT DOCUMENTS

EP    1388814 A2 *   2/2004
WO   WO 2010013160 A2 *  2/2010

OTHER PUBLICATIONS (SAS/STAT® 9.2 User's Guide, Second Edition,2009,http://support.sas.com/documentation/cdl/en/statug/63033/HTML/default/viewer.htm#statug_cluster_sect012.htm).*

* cited by examiner

*Primary Examiner* — Siamak Harandi
(74) *Attorney, Agent, or Firm* — Tarolli, Sundheim, Covell & Tummino

(57) ABSTRACT

An image analyzer (120) aggregates image samples (140) into a cluster (170) based on the image samples (140) being classified from a subset of image metrics applied to a reference sample (130). The image analyzer (120) generates an image quality output (150) by analyzing a distance (180) from the cluster (180) relative to another cluster.

14 Claims, 4 Drawing Sheets

DISTANCE-BASED IMAGE ANALYSIS

BACKGROUND

Image analysis takes on many forms for a variety of differing applications. In some cases, manual analysis can be performed wherein printed or digital images are inspected microscopically or digitally to determine whether or not an image has been generated by an authorized agent or whether some unauthorized entity has nefariously generated the image. In addition to manual analysis techniques, automated image analysis systems have increasingly been applied to improve the efficiency of inspection.

DETAILED DESCRIPTION

Figure 1:
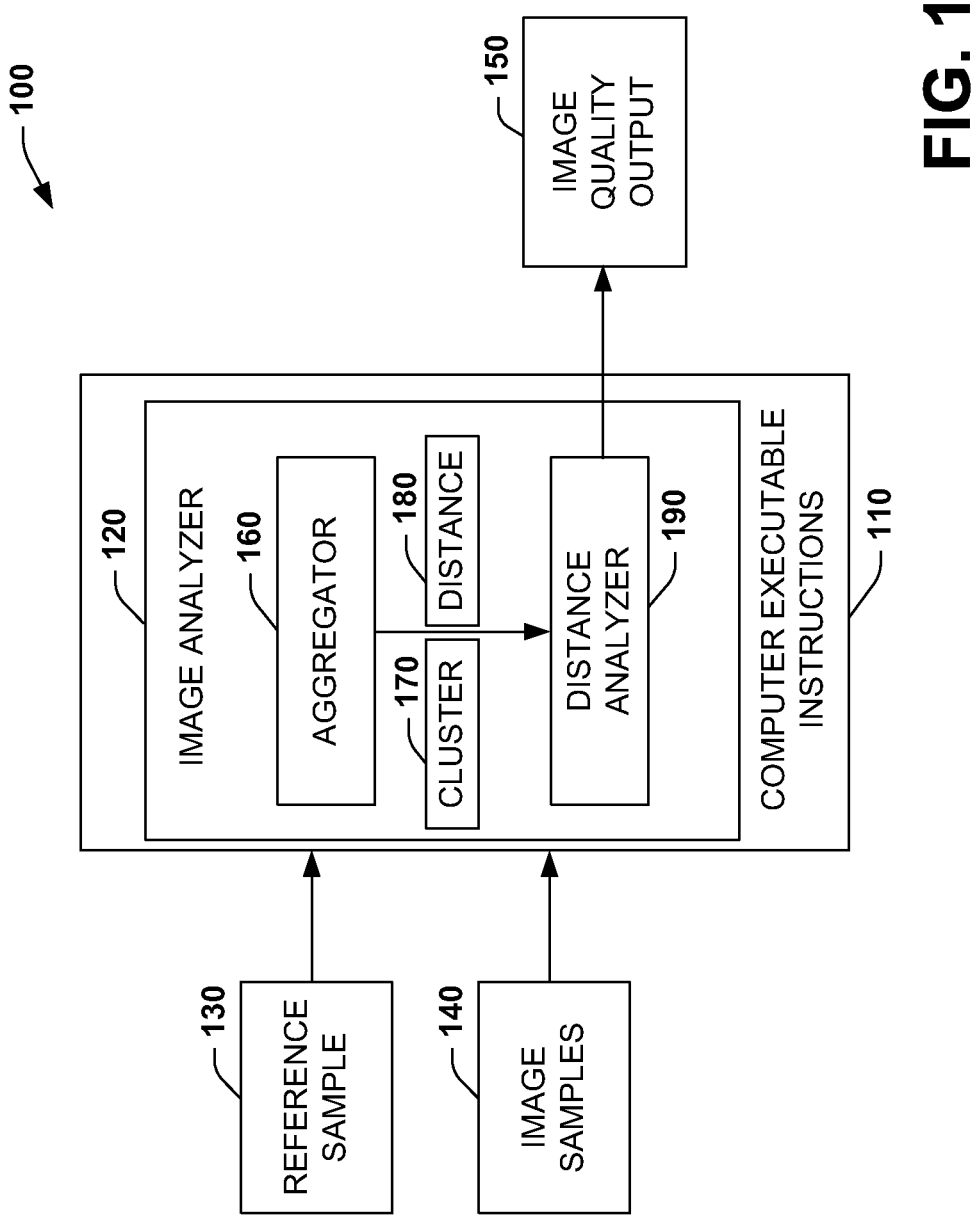
FIG. 1 illustrates an example system for performing image analysis based on distance determinations between clusters.

FIG. 1 illustrates an example system 100 for performing image analysis based on distance determinations between clusters. The system 100 includes computer executable instructions 110 that define an image analyzer 120. The image analyzer 120 can utilize a reference image sample 130 to analyze image samples 140 and generate an image quality output 150. The image analyzer 120 can include an aggregator 160 that generates a cluster 170 and distance 180 from the cluster. The cluster 170, which can include multiple sub-clusters (e.g., smaller clusters together comprising the larger cluster), is generated by the aggregator 160 via a multidimensional classification process (e.g., a trained classifier). The cluster 170 can be represented in multi-dimensional space as a collection of sample data populations that are generated from image metrics corresponding to numerous dimensions (e.g., much greater than three-dimensional space, such as hundreds of dimensions). In other words, the aggregator 160 can apply a plurality of image metrics to the reference image sample 130 to generate the cluster 170 in multi-dimensional space. Although the cluster 170 and distance 180 is often depicted in two-dimensional space, it is noted that this is for ease of visualization, as the cluster 170 and distance 180 can be represented in much higher dimensions depending on the number of image metrics, or features, employed in the analysis. For instance, the reference image sample 130 can be processed to generate a base cluster 170 and the image samples 140 can be subsequently processed by the aggregator 160 to generate separate clusters in multidimensional space (e.g., cluster and distance that requires more than three dimensions to describe relationship based on the number of metrics employed).

The distance 180 (e.g., vector distance) between clusters can then be analyzed by a distance analyzer 190 which determines how far one cluster 170 is from another cluster. Such distance 180 could be analyzed in view of a predetermined numerical distance threshold (e.g., distances above the threshold deemed to be of lower quality). A given distance threshold can correspond to one or more dimensions in the space employed to represent the clusters. Each dimension in space can thus embody some aspect of the multitude of metrics employed to analyze the respective image sets. For instance, clusters determined to be within a given distance threshold could be deemed of one quality by the distance analyzer 190 (e.g., within specification) and distances outside of the threshold (e.g., not within specification) could be deemed another quality. For example, the reference image sample 130 could be analyzed to generate a reference cluster at 170. The image samples 140 could be similarly analyzed and additional clusters generated. Based on the distance 180 determined between such clusters by the distance analyzer 190, image quality output 150 can be generated to quantify image quality. As can be appreciated, there can be a plurality of differing threshold settings to indicate a plurality of corresponding quality assessments.

The image analyzer 120 can be employed to determine differences within and between clusters 170 based on a vector distance 180 (direction and magnitude) in relevant feature-space from a reference image sample 130 (e.g., master image). The vector distance 180 can be computed with or without normalization and/or weighting (e.g., where the more salient features are weighted more heavily). In this manner, various analyses can occur from the image quality output 150. For example, the quality of counterfeited images can be determined as well as determining how close counterfeiters are able to replicate an image analyzer region of interest (ROI). In another example, print suppliers can be analyzed on image quality based on how closely they can replicate a given image to a known standard (e.g., selecting the best print supplier from a group of suppliers based on distance closeness to reference image sample). Such analysis could also include monitoring supplier quality over time where distance between image samples 140 generated from the same supplier is monitored over time, for example.

By way of further example, the image quality output 150 can be employed in a variety of applications. In one example, the image quality output 150 can be utilized for quality assurance (QA) within a print run. Also, if the image analyzer 120 indicates that multiple clusters exist, this is usually consistent with a change in quality over the run, and thus can automatically trigger a more exhaustive analysis for defects. In another application example, differences between print service providers (PSPs) based on the distance 180 can be used to determine if a given print service provider should be favored based on quality or distance from counterfeiters, for example. In yet another example, distance differences from a digital gold standard can be determined by the distance analyzer 190 that is indicative generally of the sophistication of the counterfeiter or the faithfulness of a printed image version to the original digital file for the respective image sample 140. In another example, distances 180 between counterfeiters can be detected which can be indicative of sharing among the counterfeiters or indicate quality of the counterfeiter which can signal when to migrate to a new reference image sample 130.

The image analyzer 120 utilizes a plurality of image features that are sensitive to a variety of differences in print/image quality. Thus, it can be sensitive to an array of image quality changes, not just those specifically modeled by the aggregator 160 and can accordingly be used as a general filter for changes in image quality. When the image analyzer 120 returns a change (e.g., distance value greater than a threshold) in image quality via the image quality output 150, for example, more specific defect identification models and searches can be utilized, if desired. In addition to detecting changes in image quality, the image analyzer 120 can be employed to detect proximity of a given print or counterfeiting print to a digital master. This can help to identify how counterfeiters received their original digital images, e.g., from a digital master (in which case their prints should be as close to a "Gold Master" as authentic prints, given the same printing equipment), from copying an original or integrating into a workflow (more distant from "Gold Master"), and so forth. Such image analysis can also include determining when a new image artwork is needed for use by the image analyzer 120 such as to monitor a supply chain for image counterfeiting, for example. This can occur when known counterfeit samples are close to the "Gold Master" in quality, for example.

For purposes of simplification of explanation, in the present example, different components of the system 100 are illustrated and described as performing different functions. However, one of ordinary skill in the art will understand and appreciate that the functions of the described components can be performed by different components, and the functionality of several components can be combined and executed on a single component. The components can be implemented, for example, as computer executable instructions (e.g., software, firmware), hardware (e.g., CPU, an application specific integrated circuit), or as a combination of both. In other examples, the components could be distributed among remote devices across a network, for example. The executable instructions 110 can be provided as a non-transitory computer readable medium having the computer executable instructions stored thereon.

Figure 2:
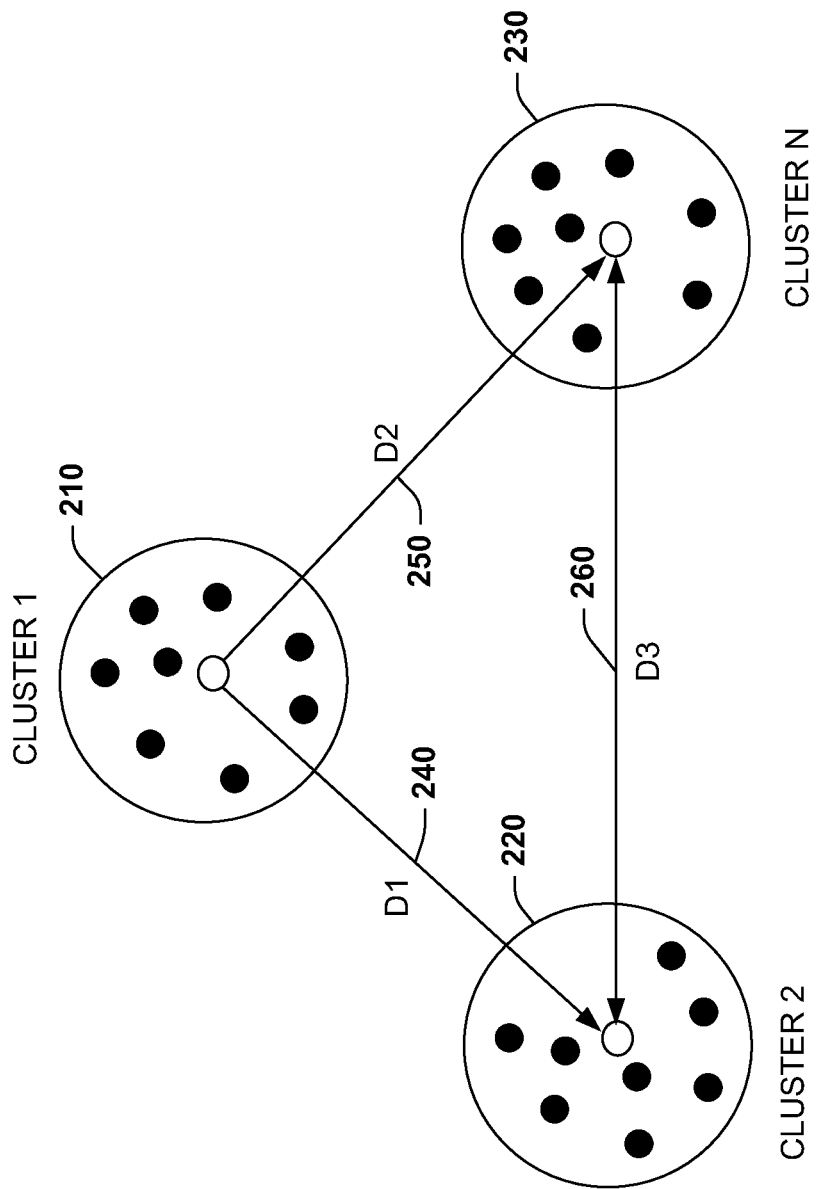
FIG. 2 illustrates an example of image clusters demonstrating distances employed for image analysis.

FIG. 2 illustrates an example of image clusters and distances employed for image analysis. A first cluster is shown at 210 along with a second cluster 220 and a third cluster N shown at 230, where N represents a positive integer describing a number of clusters. The clusters 210, 220, and 230 represent data populations that have been classified from image metrics, training data, reference images, and image samples as previously described. Such clusters 210 through 230 can be represented as a single numeric value such as via a centroid calculation for the respective data populations comprising the cluster, for example. Other numerical representations for the clusters are also possible such as computing a numerical average such as computing a numerical mean of distances between samples in a cluster. Upon determining a numerical value for the clusters at 210, 220, and 230, distances between each cluster can be determined, such as shown as distance D1 at 240 representing a distance between the cluster 210 and the cluster 220. Distance D2 between cluster 210 and 230 is shown at reference numeral 250 and a distance D3 is shown at reference numeral 260 as a distance between cluster 220 and 230. As can be appreciated, more than three clusters can be generated depending on the number of images analyzed. As the number of clusters increases, the number of distances to be analyzed can also increase. As noted previously, although the clusters 210, 220, and 230 are depicted in two-dimensional space in this example, other higher dimensions are also possible based in part on the number of metrics employed in the analysis.

In one example, the cluster at 210 may be generated as a reference group or aggregate. Thus, one type of analysis is to analyze how the distances D1 240 and D2 at 250 relate to the respective reference group 210, where such reference group can be generated from a known digital master, for example. Another type of analysis can include analyzing distances between members of the clusters such as analyzing the distance D3 shown at 260. Still yet other analysis can include analyzing distances between determined population groups within a given cluster. The distances can be generated as vectors in metric space which can include a plurality of dimensions. Thus, two clusters although having similar distances may be at different locations in the metric space. Thus, even though the distances may be similar, the fact that clusters appear in different regions of space may indicate that a quality issue has been detected such as the appearance of counterfeiters as described herein. In another example, the direction of clusters may be similar (e.g., two clusters generated in similar direction from reference cluster) but the distances differ indicating a possible change in quality.

The distances D1 at 240, D2 at 250, and D3 at 260 can be analyzed by computing normalized (e.g., weighted and corrected to have distances from about 0.0 to 1.0) distances between each of the clusters created by the image analyzer described above with respect to FIG. 1. The following tables and descriptions provide some examples as to how cluster data and distances can be analyzed. As can be appreciated, various other analyses can be performed than the examples described herein.

Table 1 provides example data for one such distance comparison and analysis where there are four groupings, or clusters, of images such as can be identified by the image analyzer described above.

TABLE 1

|  | Gold Master | Cluster 1 | Cluster 2 | Cluster 3 |
|---|---|---|---|---|
| Gold Master | — | 0.156 | 0.573 | 0.687 |
| Cluster 1 | 0.156 | — | 0.412 | 0.365 |
| Cluster 2 | 0.573 | 0.412 | — | 0.371 |
| Cluster 3 | 0.687 | 0.365 | 0.371 | — |

Table 1 illustrates example distances between three clusters detected by the image analyzer with respect to a gold master. In this example, the closest match to the (digital) gold master is cluster 1. Cluster 2 and 3 are substantially more distant from the Gold Master. The interpretation of these numbers generally depends on the context. For example, if these are from the same press, the differences can imply that there was a deleterious change in quality between cluster 1 and the combined clusters 2 and 3. If the clusters are from potentially different presses, it may be likely that the presses producing the samples aggregated into cluster 2 and 3 are of lower quality and/or of counterfeit origin, for example.

TABLE 2

|  | Cluster 1 | Cluster 2 | Cluster 3 | Cluster 4 |
|---|---|---|---|---|
| Cluster 1 | — | 0.122 | 0.421 | 0.544 |
| Cluster 2 | 0.122 | — | 0.344 | 0.279 |
| Cluster 3 | 0.421 | 0.344 | — | 0.131 |
| Cluster 4 | 0.544 | 0.279 | 0.131 | — |

Table 2 shows a set of cluster-cluster distances based on a printed digital master. In this example, there are a number of legitimate printed samples available such as determined for cluster 1. These may be closely related to the original digital "gold masters" as for cluster 1 in Table 1; however, in Table 2 the distances among the clusters themselves are shown. Thus, in the example shown at Table 2, cluster 2 is similar to Cluster 1, and likely of acceptable quality (e.g., as determined by comparison to predetermined threshold). Clusters 3 and 4 are of pejorative quality, and thus are likely counterfeits, for example. Clusters 1 and 2 are similar (Distance=0.122) and clusters 3 and 4 are similar (Distance=0.131), while the next closest match is between cluster 2 and 4 (Distance=0.279). In this example data set, cluster 1 can be a "known authentic" sample corresponding to samples printed on a legitimate press. Thus, cluster 1 represents the original authentic image set from the authentic, highest-quality or otherwise "qualified" PSP (print service provider). In Table 2, it can be observed that cluster 2 is closely related to cluster 1 but clusters 3 and 4 are not. To provide context, cluster 2 may have been performed at a low-cost/low-quality/otherwise-different PSP and clusters 3 and 4 may be considered counterfeits.

TABLE 3

|        | Original | Time 1 | Time 2 | Time 3 | Time 4 |
|--------|----------|--------|--------|--------|--------|
| Original | —      | 0.110  | 0.087  | 0.223  | 0.245  |
| Time 1 | 0.110    | —      | 0.067  | 0.193  | 0.255  |
| Time 2 | 0.087    | 0.067  | —      | 0.277  | 0.309  |
| Time 3 | 0.223    | 0.193  | 0.277  | —      | 0.227  |
| Time 4 | 0.245    | 0.255  | 0.309  | 0.227  | —      |

Table 3 shows an example where print quality changes over time, indicated by the change in distances as measured using the image analyzer between times. In these examples, the image analyzer can force aggregation by time (referred to as the "formation of constrained aggregates") and then employ feature pruning algorithms to select the feature sets for optimally distinguishing between times. The results in Table 3 are substantially unambiguous showing that some change in print quality occurred between Time 2 and Time 3. This could be due to changes in print substrates, print settings, printers used, print locations, differences employed by print personnel, or differences detected in counterfeiting, for examples.

Figure 3:
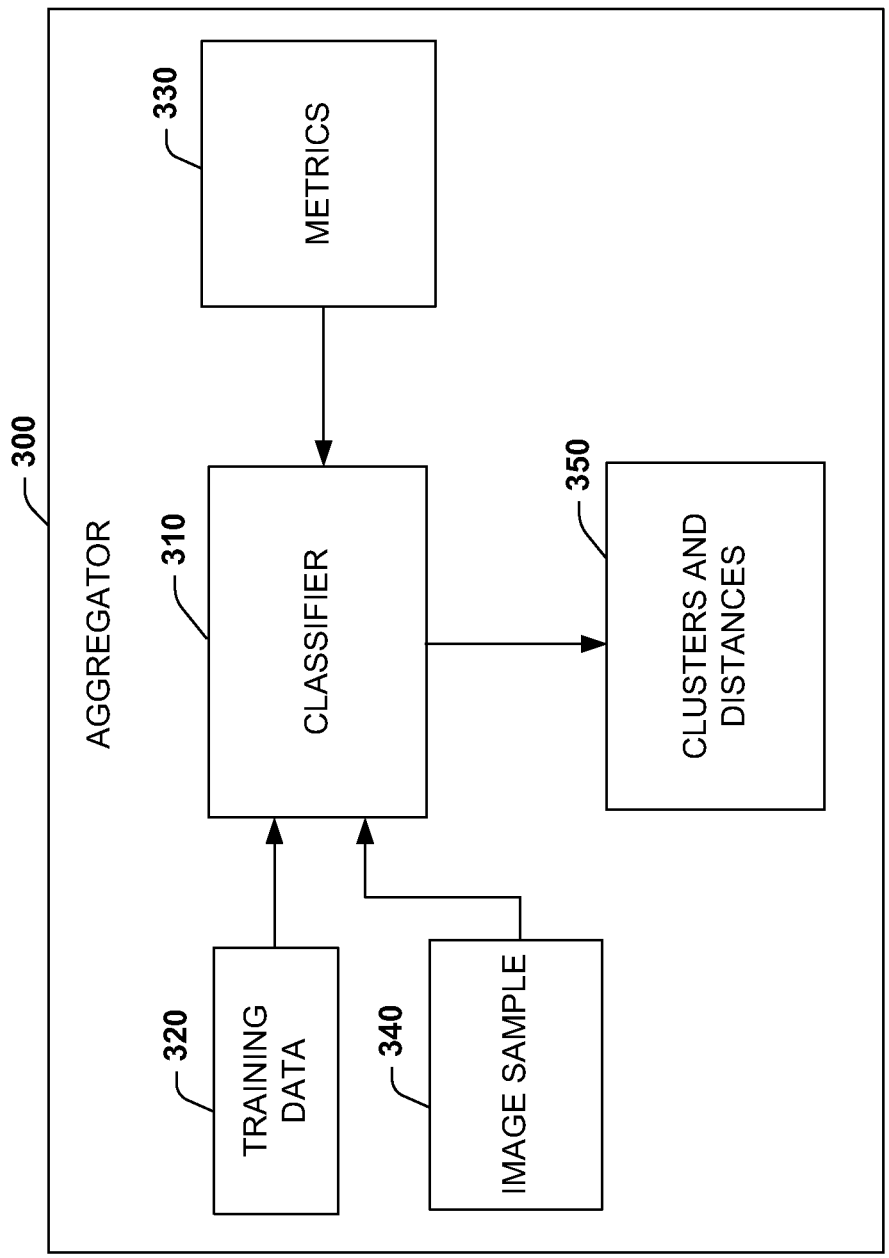
FIG. 3 illustrates an example aggregator to generate clusters and distances for image analysis.

FIG. 3 illustrates an example aggregator 300 to generate clusters and distances for image analysis. The aggregator can include a classifier 310 that processes input from training data 320, metrics 330, and an image sample 340 to generate clusters and distances at 350 as previously described. The training data 320 can include digital master images or known authentic images that help the classifier learn substantially ideal characteristics for images that can be applied to the image sample 340 and in view of the metrics 330. After suitable training has occurred, the classifier 310 can generate the clusters and distances 350 by analyzing the image sample 340 (or samples) with respect to the metrics 330.

The metrics 330 can be derived from a larger set of metrics and when defined as a metric subset, provide a description of the data population of interest. The same set of metrics can be also used, comparatively, to find additional clustering information of suspect samples. In one example, an initial set of metrics is pruned to a more manageable set that is based on independence between metrics and computed for each representation of the image. Such metrics 330 can be employed to map or transform the original RGB (red, green, blue) images as follows: (1) Rchannel, (2) Gchannel, (3) Bchannel, (4) Cyan, C=(G+B−R+255)/3, channel, (5) Magenta, M. (R+B−G+256)/3, channel, (6) Yellow, Y. (R+G−B+255)/3, channel, (7) Hue, (8) Saturation=max(R,G,B)*(1−min(R,G,B)/sum (R,G,B)), (9) Intensity=(R+G+B)/3, and (10) Pixel Variance ("edge" space), for example, the latter defined as the as mean difference (in intensity) between a pixel and its four diagonally closest neighboring pixels. For each of these 10 maps, there can be a subset of metrics, assigned to one of three broad sets of example metrics. For example, histogram metrics can include: Mean, Entropy, StdDev, Variance, Kurtosis, Pearson Skew, and Moment Skew. Projection Profile Metrics can include, for example, horizontal and vertical profiles such as: Entropy, StdDev, Delta StdDev, Mean, Mean Longest Run, Kurtosis, Skew, Moment Skew, Delta Kurtosis, Delta Pearson Skew, Delta Moment Skew, Lines Per Inch, Graininess, Pct In Peak, and Delta Mean, for example. For Delta metrics, the differences between consecutive profiles in the projection data can be used as the primary statistics.

Such metrics 330 can be computed for each image of interest in the training data 320. When the metrics are computed for each of the samples, the expected population description for each of the metrics is computed. A large set of metrics 330 can be distilled to a more manageable set by taking into account the fact that each of the metrics is not fully independent. Thus, a smaller subset of metrics 330 can be selected by determining which metrics are most independent (e.g., analyzing the mean correlation of a metric against the set of metrics). After determining a set of surviving metrics 330, such metrics can be compared to different aggregated populations of images by the classifier 310, where differing distances between clusters are generated and subsequently analyzed to determine image quality.

Figure 4:
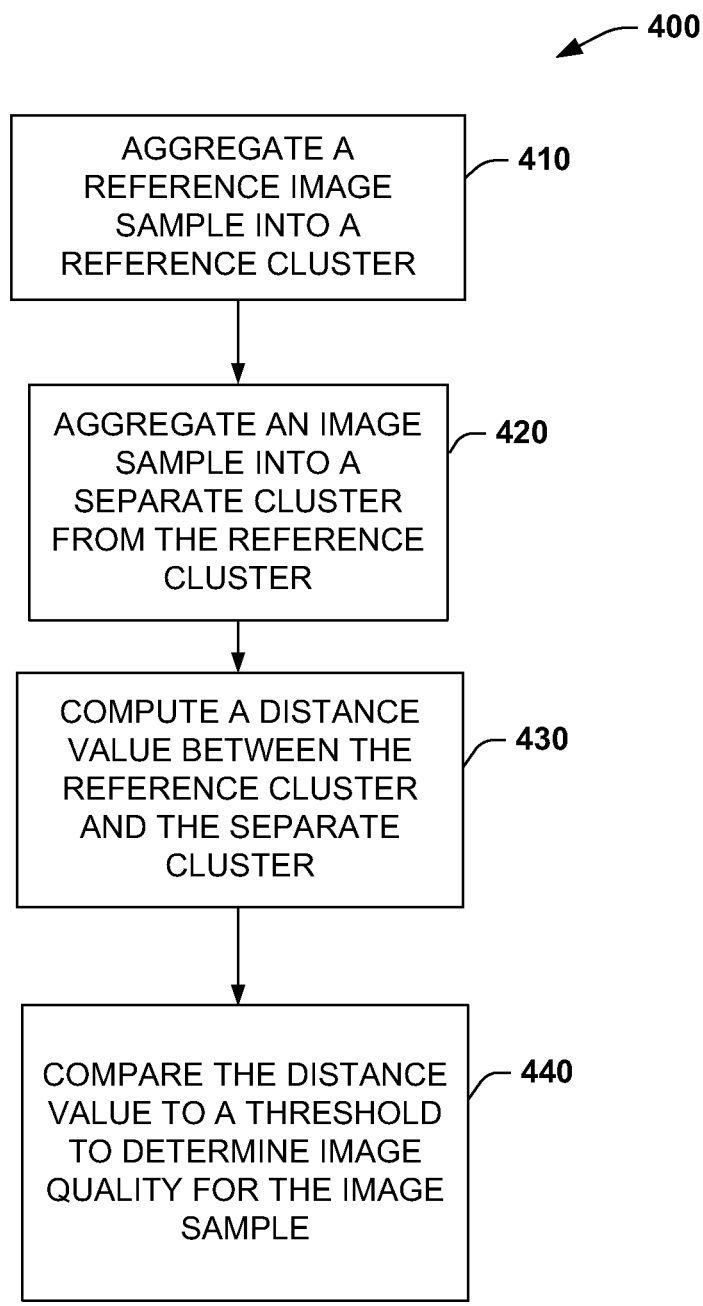
FIG. 4 illustrates an example method for image analysis.

In view of the foregoing structural and functional features described above, an example method will be better appreciated with reference to FIG. 4. While, for purposes of simplicity of explanation, the method is shown and described as executing serially, it is to be understood and appreciated that the method is not limited by the illustrated order, as parts of the method could occur in different orders and/or concurrently from that shown and described herein. Such a method can be executed by a processor and associated equipment, for example.

FIG. 4 illustrates an example method 400 to facilitate image analysis. The method 400 includes aggregating a reference image sample into a reference cluster at 410 (e.g., via aggregator 160 in FIG. 1). The method 400 includes aggregating an image sample into a separate cluster from the reference cluster at 420 (e.g., also via the aggregator 160). The method 400 includes computing a distance value between the reference cluster and the separate cluster at 430 (e.g., via distance analyzer 190 in FIG. 1). The method 400 also includes comparing the distance value to a threshold to determine image quality for the image sample at 400 (e.g., via image analyzer 120 of FIG. 1). Other aspects of the method, although not shown, can include generating multiple clusters from a plurality of image samples, wherein distance values are compared to the reference cluster and/or distance values are compared between the multiple clusters to determine image quality for the image samples. This can include generating the reference cluster from a digital master image or generating the reference cluster from an authenticated set of images, for example.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory computer readable medium comprising computer executable instructions that when executed cause a processor to:
   aggregate a reference image sample into a reference cluster, wherein the reference image sample is generated from an initial set of images from a supplier;

aggregate another image sample into another cluster based on the another image sample being classified from a subset of image metrics applied to the reference image sample; and generate an image quality output by analyzing a distance from the reference cluster relative to the another cluster, wherein the image quality output is monitored over time to determine a quality for the supplier.

2. The non-transitory computer readable medium of claim 1, wherein the initial set of images from the supplier comprises a digital master representing the reference image sample.

3. The non-transitory computer readable medium of claim 1, wherein the initial set of images from the supplier comprises a sample set of authenticated images.

4. The non-transitory computer readable medium of claim 1, further comprising computer executable instructions that when executed cause the processor to generate the image quality output by comparing the distance between a plurality of clusters of the another image sample that are different from the reference cluster.

5. The non-transitory computer readable medium of claim 1, further comprising computer executable instructions that when executed cause the processor to determine the distance as a vector distance for the another cluster.

6. The non-transitory computer readable medium of claim 5, further comprising computer executable instructions that when executed cause the processor to determine the vector distance as a normalized distance value between zero and one.

7. The non-transitory computer readable medium of claim 6, further comprising computer executable instructions that when executed cause the processor to determine the normalized distance value from a centroid value determined from data populations associated with the another cluster or cause the processor to determine the normalized distance value as an average between data populations in the another cluster.

8. The non-transitory computer readable medium of claim 5, further comprising computer executable instructions that when executed cause the processor to analyze a direction of the vector distance to determine another measure of relative image quality.

9. A method, comprising:
aggregating, by a processor, a reference image sample into a reference cluster;
aggregating, by the processor, an image sample into a separate cluster from the reference cluster;
computing, by the processor, a distance value between the reference cluster and the separate cluster;
comparing, by the processor, the distance value to a threshold to determine image quality for the image sample; and
at least one of:
determining, by the processor, a quality assurance within a print run based on the image quality;
determining, by the processor, differences between print service providers based on the image quality;
determining, by the processor, differences to between the reference image sample and the image sample based on the image quality, wherein the reference image sample is a digital master image; and
determining, by the processor, an effectiveness of counterfeiters by analyzing distances and directions between clusters based on the image quality.

10. The method of claim 9, further comprising generating multiple clusters from a plurality of image samples, wherein distance values are compared to the reference cluster or distance values are compared between the multiple clusters to determine image quality for the image samples.

11. The method of claim 9, further comprising generating the reference cluster from a digital master image or generating the reference cluster from an authenticated set of images.

12. A system comprising:
a memory for storing computer executable instructions; and
one or more processors for accessing the memory and executing the computer executable instructions, the computer executable instructions comprising:
an image analyzer to process a reference image sample and an image sample and to generate an image quality output from the samples, wherein the image analyzer comprises;
an aggregator to generate a reference cluster from the reference image sample and a separate cluster from the image sample, and to generate a vector distance value for the clusters, wherein the aggregator employs a classifier to determine the clusters and vector distance value based on a set of image metrics applied to the samples; and
a distance analyzer to compare the vector distance value between the clusters to determine an image quality for the samples and to analyze a direction of the vector distance values between clusters to determine another measure of relative image quality for the samples.

13. The system of claim 12, wherein the vector distance comprises a normalized distance value between zero and one.

14. The system of claim 13, wherein the normalized distance value is determined from a centroid value determined from data populations associated with the separate cluster or as an average between data populations in the separate cluster.

* * * * *